United States Patent
Dowhower et al.

(10) Patent No.: US 9,643,725 B2
(45) Date of Patent: *May 9, 2017

(54) SAFETY DEVICE FOR PREVENTION OF ACCIDENTAL AIRBAG DEPOLYMENT

(71) Applicant: The Boeing Company, Chicago, IL (US)

(72) Inventors: Thomas E. Dowhower, Summerville, SC (US); Peter M. Heinrich, Pleasant, SC (US); John A. Lepore, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,959

(22) Filed: Jul. 17, 2015

(65) Prior Publication Data

US 2017/0015424 A1    Jan. 19, 2017

(51) Int. Cl.
| | | |
|---|---|---|
| *B60R 21/01* | (2006.01) | |
| *B60R 22/00* | (2006.01) | |
| *B64D 11/00* | (2006.01) | |
| *B64D 25/00* | (2006.01) | |
| *B64D 11/06* | (2006.01) | |
| *B60R 22/02* | (2006.01) | |

(52) U.S. Cl.
CPC ........ *B64D 11/06205* (2014.12); *B64D 25/00* (2013.01); *B60R 2021/01177* (2013.01); *B60R 2022/021* (2013.01); *B64D 2201/00* (2013.01)

(58) Field of Classification Search
CPC .......... B64D 11/06205; B64D 11/0621; B64D 11/062; B64D 2201/00; B64D 25/00; B60R 21/18; B60R 21/01544; B60R 21/01546; B60R 2021/01177; B60R 2022/021

See application file for complete search history.

(56) References Cited

U.S. PATENT DOCUMENTS

| | | | | |
|---|---|---|---|---|
| 3,760,464 | A * | 9/1973 | Higuchi | A44B 11/2526 24/196 |
| 3,868,627 | A * | 2/1975 | Lawwill | A44B 11/2511 200/61.58 B |
| 6,389,661 | B1 | 5/2002 | Brown et al. | |
| 6,442,807 | B1 * | 9/2002 | Adkisson | A44B 11/2503 24/602 |
| 7,263,750 | B2 * | 9/2007 | Keene | A44B 11/2526 24/265 B |

(Continued)

*Primary Examiner* — Barry Gooden, Jr.
(74) *Attorney, Agent, or Firm* — Economou Silfin LLP; John S. Economou

(57) ABSTRACT

A safety device has a lower portion and an upper portion. The lower portion defines a cavity for receiving a seat belt buckle assembly and has at least one rear wall portion extending between opposing sidewalls that partially define the cavity. The rear wall portion forms a slot area to permit a strap attached to the seat belt buckle assembly to extend from the cavity when the seat belt buckle assembly is positioned in the cavity. The rear wall portion is configured to prevent the seat belt buckle assembly from moving laterally out of the cavity. The upper portion is hingedly coupled to the lower portion such that the upper portion completely covers the cavity of the lower portion when the upper portion is rotated into engagement with the lower portion.

19 Claims, 3 Drawing Sheets

(56) References Cited

U.S. PATENT DOCUMENTS

| | | | |
|---|---|---|---|
| 7,904,997 B2* | 3/2011 | Foubert | A44B 11/2526 24/631 |
| 8,556,293 B2* | 10/2013 | Baca | B60R 21/18 280/733 |
| 8,661,625 B2 | 3/2014 | Carene et al. | |
| 9,173,456 B2* | 11/2015 | Kohlndorfer | A44B 11/2526 |
| 2010/0115737 A1* | 5/2010 | Foubert | A44B 11/2526 24/164 |
| 2012/0256403 A1* | 10/2012 | Shields | B60R 22/48 280/733 |
| 2012/0259503 A1* | 10/2012 | Settles | G05B 23/0256 701/31.5 |
| 2012/0259586 A1* | 10/2012 | Shields | G05B 23/0256 702/183 |
| 2012/0292893 A1* | 11/2012 | Baca | B60R 21/18 280/730.1 |
| 2013/0187646 A1* | 7/2013 | Baca | G01R 33/0047 324/262 |

* cited by examiner

SAFETY DEVICE FOR PREVENTION OF ACCIDENTAL AIRBAG DEPOLYMENT

FIELD

This disclosure relates generally to a safety device used to prevent the accidental deployment of airbags, particularly during installation of assemblies including airbags.

BACKGROUND

Recently, airlines have begun to include airplane airbags in the seat belts of at least some seats in their airplanes. These airplane airbags have been found to lessen the impact of minor accidents on passengers, and in particular to reduce head and neck injury to the passengers. Such airbags operate differently than automotive airbags, which expand out of the car dashboard towards the driver or front seat passenger. Instead, airplane airbags inflate away from the passenger to generate a cushion between the passenger and any structure forward of the passenger (e.g., another row of seats or a bulkhead).

Airplane airbags are typically energized for activation only when the tongue plate (or latch plate) and buckle on the passenger's seat belt are fastened together. Airbag inflation occurs at a very high rate. To prevent accidental activation of such airbags, it is important to ensure that no power is provided during the shipping, assembly, and installation of seat belts that include airplane airbags. For the same reason, it is also important to ensure that the tongue plate and buckle portions of the passenger seat belt be kept separated because static charge might accumulate on the tongue plate and buckle and possibly cause airbag inflation. Typically, the buckle and tongue plate for airplane seat belts are both formed from metallic materials.

To keep the two portions (buckle and tongue plate) separate, at least one of the two portions is typically wrapped in a plastic wrap material to prevent contact between the two metallic parts during shipping, assembly and installation. However, this is not a robust solution as the plastic wrap material used to cover the part (or parts) is easily torn, potentially allowing contact between the buckle and tongue plate and thus potentially risking airbag inflation during shipping, assembly, and installation. Furthermore, a worker might remove the plastic wrap material prior to assembly and installation, not understanding that that plastic wrap material provided protection from accidental airbag discharge.

SUMMARY

In a first aspect, a safety device for preventing accidental discharge of an airbag includes a lower portion and an upper portion. The lower portion defines a cavity for receiving a seat belt buckle assembly and has at least one rear wall portion extending between opposing sidewalls that partially define the cavity. The at least one rear wall portion forms a slot area to permit a strap attached to the seat belt buckle assembly to extend from the cavity when the seat belt buckle assembly is positioned in the cavity. The at least one rear wall portion is configured to prevent the seat belt buckle assembly from moving laterally out of the cavity. The upper portion is hingedly coupled to the lower portion and completely covers the cavity of the lower portion when the upper portion is rotated into engagement with the lower portion.

The upper portion and the lower portion may be formed from separate parts, and the upper portion part maybe mated to the lower portion part via a hinge mechanism. In one embodiment, the lower portion may be formed from a first non-conductive material and the upper portion may be formed from a second non-conductive material. In another embodiment, the lower portion and the upper portion may be formed from a same non-conductive material. In yet another embodiment, the upper portion and the lower portion may be formed from a single part composed of a single non-conductive material, and the upper portion may be hingedly connected to the lower portion via a hinge line defined in the non-conductive material.

The lower portion may have a planar portion and three adjacent sidewalls positioned at three adjacent edges of the planar portion, with two of the sidewalls on opposing sides of the planar portion and the planar portion and the three adjacent sidewalls configured to form the cavity for receiving the seat belt buckle assembly. In one further embodiment, the at least one rear wall portion may be a single rear wall portion. In another further embodiment, the at least one rear wall portion may have two separate opposing portions. Still further, inward ends of each rear wall portion may be spaced apart to form a gap to allow the seat belt buckle assembly and associated strap to be inserted into the cavity.

In another further embodiment, the upper portion may be hingedly coupled to the lower portion via a third sidewall on the lower portion. The upper portion may provide access to the cavity of the lower portion when the upper portion is rotated away from the lower portion.

In yet another further embodiment, the safety device includes means for securely latching the upper portion to the lower portion. In one embodiment, the means for securely latching the upper portion to the lower portion may be a locking arm having an end projection mounted on the upper portion and a tab extending inward on an inner portion of one of the opposing sidewalls of the lower portion, with the end projection configured to engage the tab when the upper portion is rotated against the lower portion to hold the upper portion securely against the lower portion. In another embodiment, the means for securely latching the upper portion to the lower portion may be two locking arms each having an end projection mounted on the upper portion and two tabs each extending inward on respective ones of the two opposing sidewalls of the lower portion, with each end projection configured to engage an associated one of the two tabs when the upper portion is rotated against the lower portion to hold the upper portion securely against the lower portion.

The safety device may include an outwardly extending mounting tab extending from one of the opposing sidewalls, the mounting tab including an aperture therein.

In a still further embodiment, the lower portion may include a channel on a lower surface thereof formed in a built-up area of the lower surface for securely holding a tongue plate, the channel adapted to fit an outer periphery of the tongue plate. The lower portion may also include a tab adapted to snugly fit into an inner aperture in the tongue plate.

In a second aspect, a method for covering a buckle assembly of a seatbelt using a safety device. The safety device has a lower portion defining a cavity and at least one rear wall portion extending between opposing sidewalls that partially define the cavity. The at least one rear wall portion forms a slot area. The at least one rear wall configured to prevent the seat belt buckle assembly from moving laterally out of the cavity. The safety device further including an upper portion hingedly coupled to the lower portion. The buckle assembly is positioned in the cavity of the lower portion such that a strap coupled to the buckle assembly extends from the lower portion through the slot area. The upper portion is rotated with respect to the lower portion such that the upper portion completely covers the buckle assembly. Finally, the upper portion is engaged with the lower portion to secure the buckle assembly in the cavity.

In a further embodiment, the lower portion includes a channel on a lower surface thereof formed in a built-up area of the lower surface for securely holding a tongue plate. The channel is adapted to fit an outer periphery of the tongue plate. A tab is adapted to snugly fit into an inner aperture in the tongue plate. A tongue plate is positioned against the lower surface so that the outer periphery of the tongue plate fits into the channel and the tab snugly fits into the inner aperture in the tongue plate.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure. The safety device described herein can prevent any contact between the two portions of the seat belt buckle mechanism and thus overcomes the problems recited above.

Figure 1:
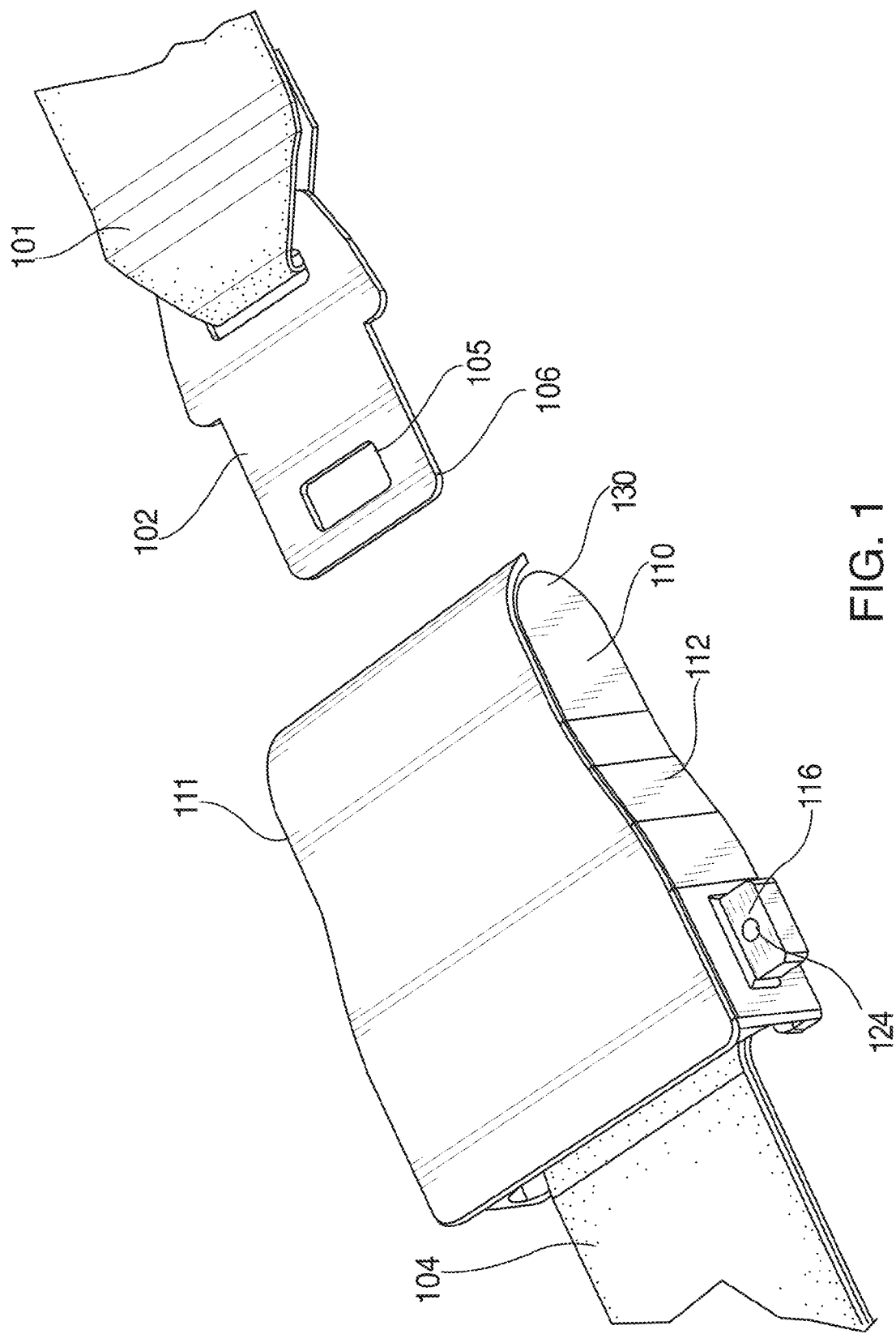
FIG. 1 is a perspective upper view of a closed safety device according to an embodiment of the present disclosure with a seat belt buckle installed therein.
Figure 2:
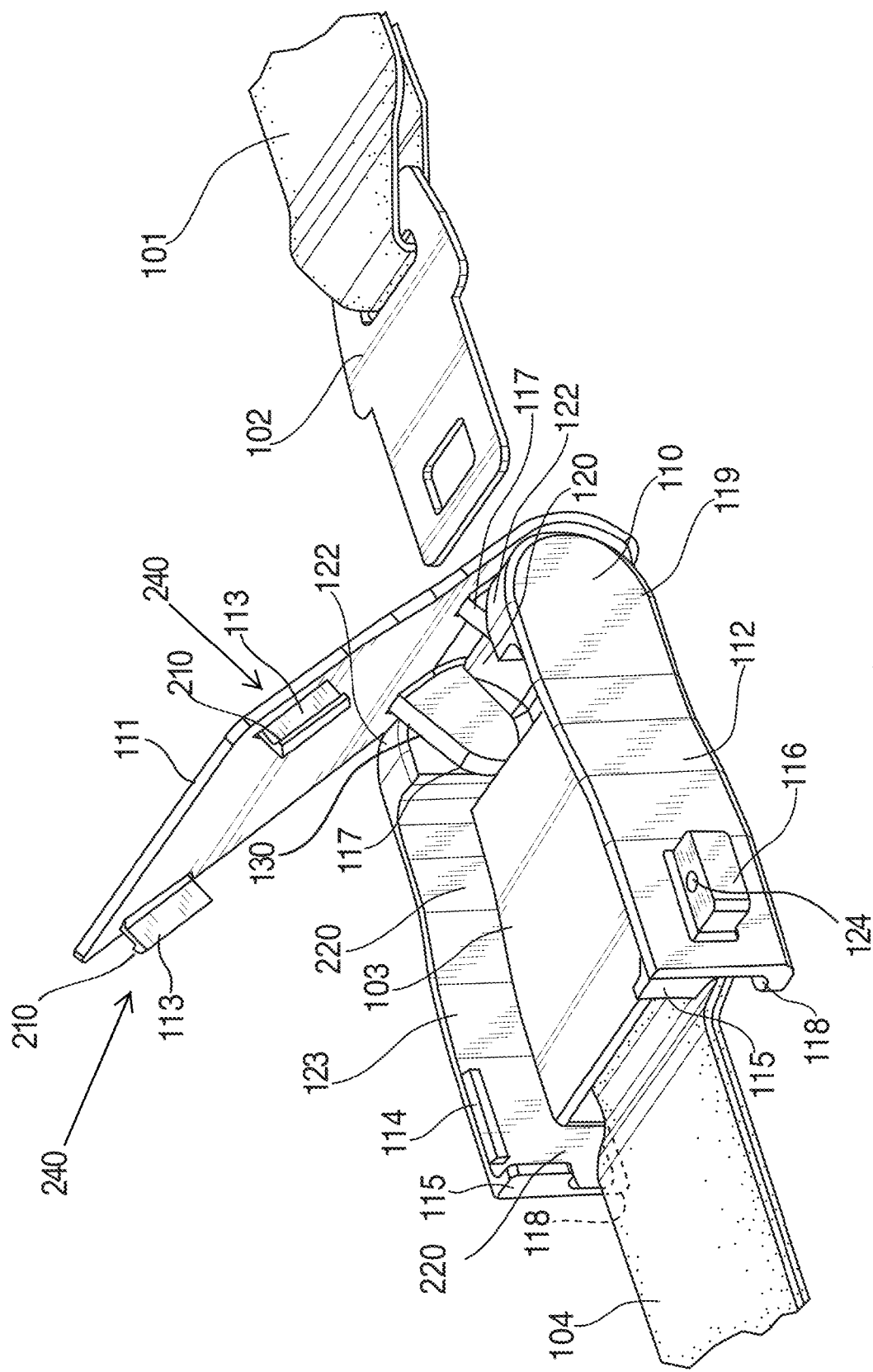
FIG. 2 is a perspective upper view of an open safety device according to an embodiment of the present disclosure with a seat belt buckle installed therein.

Referring now to FIG. 1, a safety device 110 is shown which provides a robust solution to the problems of the prior art discussed above. An airplane seatbelt includes a first strap 101 and an associated tongue plate 102, and a second strap 104 and an associated buckle assembly 103 (shown in FIG. 2). Tongue plate 102 has an outer periphery 106 and includes an inner aperture 105. During use, a passenger secures the seatbelt by inserting tongue plate 102 into buckle assembly 103, which holds tongue plate 102 securely until the buckle assembly is released by the passenger. The insertion of tongue plate 102 into buckle assembly 103 may also activate an associated airplane airbag, when installed. Safety device 110 includes a lower portion 112 and an upper portion 111 which are coupled together to form a clamshell structure via a hinge mechanism 130. The lower portion 112 defines a cavity 220 (FIG. 2). When positioned over buckle assembly 103 and the upper portion 111 is secured against the lower portion 112, safety device 110 completely covers buckle assembly 103 to eliminate contact between buckle assembly 103 and tongue plate 102, which can prevent activation of an associated airplane airbag and thus preventing any accidental discharge of the airplane airbag.

Each portion 111, 112 of safety device 110 is constructed from a non-conductive material, e.g., a thermoplastic material. In one embodiment, safety device 110 is configured to cover any seat belt buckle assembly found on commercial, commuter, or private aircraft. In another embodiment, different sizes of safety device 110 may be provided for differently-sized buckle assemblies. Safety device 110 can prevent accidental discharge of the airplane airbags until installation is complete, when safety device 110 may be removed. Safety device 110 also includes a mounting tab 116, preferably including an aperture 124 therein. The aperture 124 may be used to secure a tag including instructions for use and appropriate safety warnings to the safety device 110. Mounting tab 116 may also be used to secure an external fastener, such as a wire or string, around safety device 110 to ensure that safety device 110 remains closed until assembly is complete. A second mounting tab 116 may be provided on the opposite side of lower portion 112 to more easily secure such external fastener.

Referring now to FIG. 2, buckle assembly 103 is shown positioned in the lower portion 112 of safety device 110. The lower portion 112 includes two opposing sidewalls 119, 123 and a third sidewall wall 120 mounted on a planar portion 121 (shown in FIG. 3). The sidewalls 119, 123 and the third sidewall wall 120 at least partially defined the cavity 220. The lower portion 112 includes at least one rear wall portion 115 to prevent buckle assembly 103 from sliding out of the safety device 110 when in a closed position (as shown in FIG. 1), while also allowing buckle assembly 103 with its associated strap 104 to be inserted into safety device 110. The at least one rear wall portion 115 further defines the cavity 220. In FIG. 2, two inwardly extending rear wall portions 115 are provided at a rear part of the lower portion 112, which form a partially enclosed slot area 118 and a gap 230 between each inwardly extending rear wall portion 115. In an alternative embodiment, the two inwardly extending rear wall portions 115 may be replaced by a single rear wall portion, in which case strap 104 may be temporarily disengaged from buckle assembly 103 for installation of buckle assembly 103 into safety device 110.

Slot area 118 provides spacing to allow strap 104 to exit via the rear portion of safety device 110 after buckle assembly 103 is installed therein. Slot area 118 may also extend into the bottom part of lower portion 112, as shown by reference number 310 in FIG. 3. The upper portion 111 of safety device 110 may include a latching mechanism 240 having two locking arms 113, which include end projections 210 where the end projections 210 mate with tabs 114 (one of the tabs 114 is not visible in FIG. 2) when the upper portion 111 is pushed down for securely latching the upper portion 111 against lower portion 112. In an alternative embodiment, latching mechanism 240 may include only one locking arm 113 to mate with a single tab 114 for securely latching the upper portion 111 against lower portion 112.

Upper portion 111 is hingedly connected to lower portion 112 in any conventional manner. In one example, the lower portion 112 and the upper portion 111 are formed as separate parts. In such an embodiment, the hinge mechanism 130 may include two projections 117 extending from the upper portion 111 and pins extending outwardly and include an aperture in a widened internal portion 122 of each sidewall 119, 123 in lower portion 112. The pins are positioned in an associated aperture in the widened internal portions 112 of the sidewalls 119, 123 to form the hinge mechanism 130. Other types of hinge mechanisms may also be alternatively used. For example, in an alternative embodiment, upper portion 111 and lower portion 112 may be formed together as a single part, and the hinge mechanism is formed as a hinge line defined in the material along the edge separating the upper portion 111 from the lower portion 112. The hinge line can be a crease, perforated line, groove, or any other suitable line of weakness that allows the upper portion 111 and the lower portion 112 to rotate relative to each other.

To use safety device 110, the buckle assembly 103 is positioned in the cavity 220 of the lower portion 112 such that strap 104 coupled to buckle assembly 103 extends from the lower portion 112 through the slot area 118. The upper portion 111 is rotated with respect to the lower portion 112 such that the upper portion 112 completely covers the buckle assembly 103 (as shown in FIG. 1). Finally, the upper portion 112 is engaged with the lower portion 111 to secure the buckle assembly 103 in the cavity 220 of the lower portion 112. Once the upper portion 112 is engaged with the lower portion 111, the upper portion 112 completely covers the cavity 220 of the lower portion 111.

Figure 3:
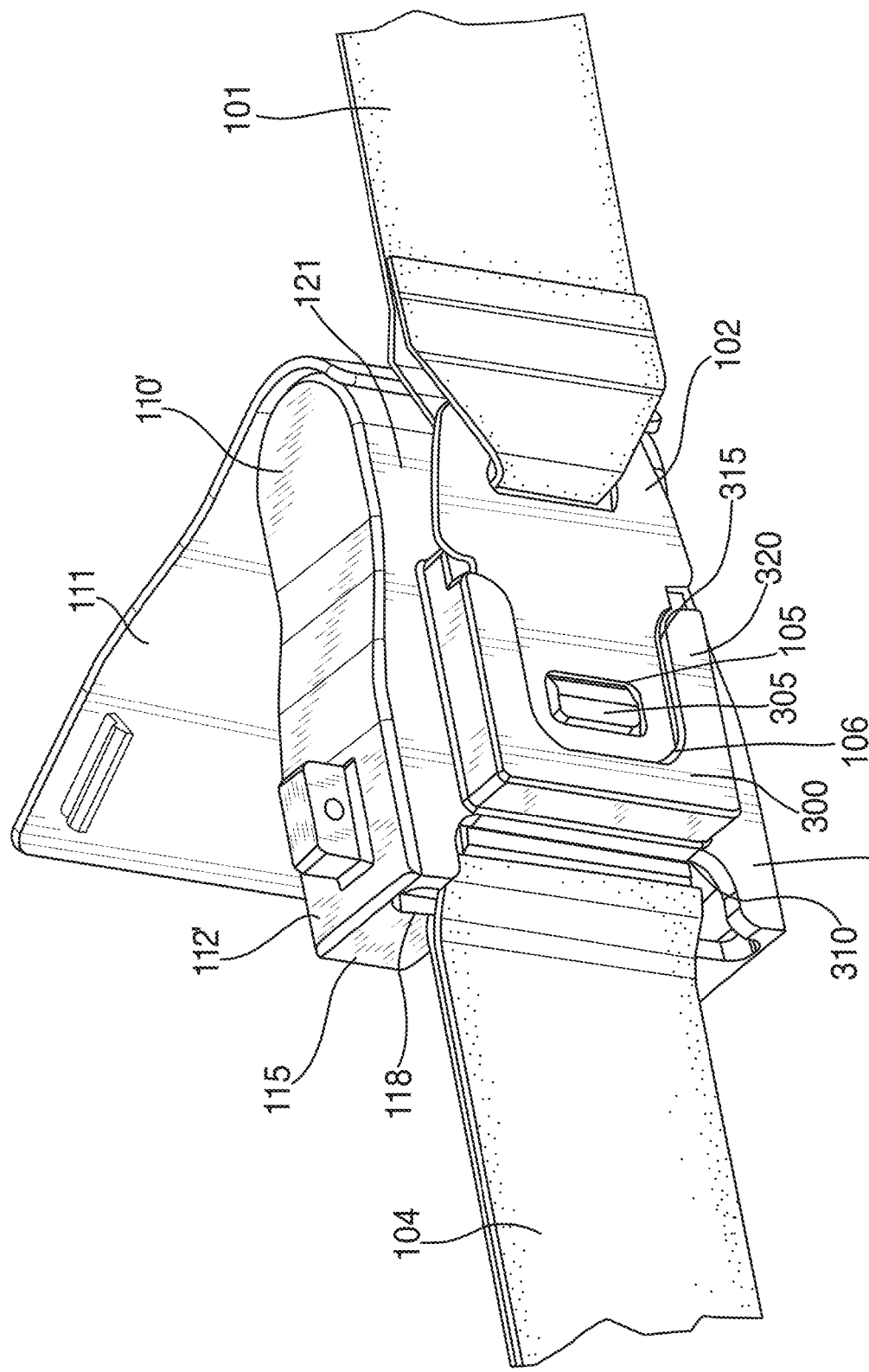
FIG. 3 is a perspective lower view of an open safety device according to a further embodiment of the present disclosure with a seat belt buckle installed therein.

Referring now to FIG. 3, in a further embodiment, safety device 110' is substantially similar to safety device 110 shown in FIGS. 1 and 2, except lower portion 112' may include a tongue plate securing structure 300 formed on a lower surface 325 of lower portion 112' for securely holding tongue plate 102 during shipping, assembly, and installation. In this manner, an additional measure of security can be provided to help ensure that tongue plate 102 will not be able to be contact buckle assembly 103. Securing structure 300 includes a built-up area 320 forming a channel 315 and also includes a tab 305 within slot 315. Channel 315 is adapted to fit the outer periphery 106 of tongue plate 102. Tab 305 is sized to fit snugly into the inner aperture 105 in tongue plate 102, such that when tongue plate 102 is positioned into slot 315 and onto tab 305, tongue plate 102 is held there securely and separately from buckle assembly 103. In this manner, tongue plate 102 may be positioned against the lower surface 325 so that outer periphery 106 of tongue plate 102 fits into channel 315 and tab 305 snugly fits into inner aperture 105 of tongue plate 102, securely holding tongue plate 102 to lower portion 112'.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A safety device for preventing accidental discharge of an airbag, the safety device comprising:
a lower portion formed from a non-conductive material and defining a cavity having a volume at least as large as an entire seat belt buckle assembly, wherein the lower portion comprises at least one rear wall portion extending between opposing sidewalls that partially define the cavity, the at least one rear wall portion forming a slot area to permit a strap attached to the seat belt buckle assembly to extend from the cavity when the seat belt buckle assembly is positioned in the cavity, and wherein the at least one rear wall portion is configured to prevent the seat belt buckle assembly from moving laterally out of the cavity; and
an upper portion formed from a non-conductive material and hingedly coupled to the lower portion, wherein the upper portion completely covers the cavity of the lower portion when the upper portion is rotated into engagement with the lower portion.

2. The safety device of claim 1, wherein the lower portion comprises a planar portion and three adjacent sidewalls positioned at three adjacent edges of the planar portion, two of the sidewalls on opposing sides of the planar portion, the planar portion and the three adjacent sidewalls configured to define the cavity for receiving the seat belt buckle assembly.

3. The safety device of claim 1, wherein the at least one rear wall portion comprises a single rear wall portion extending between opposing sidewalls of the lower portion.

4. The safety device of claim 1, wherein the upper portion is hingedly coupled to the lower portion via a third sidewall on the lower portion.

5. The safety device of claim 1, wherein the upper portion provides access to the cavity of the lower portion when the upper portion is rotated away from the lower portion.

6. The safety device of claim 1, further comprising an outwardly extending mounting tab extending from one of the opposing sidewalls, the mounting tab including an aperture therein.

7. The safety device of claim 1, wherein the at least one rear wall portion comprises two separate opposing portions, wherein each rear wall portion extends from a sidewall of the lower portion.

8. The safety device of claim 7, wherein inward ends of each rear wall portion are spaced apart to form a gap to allow the seat belt buckle assembly and associated strap to be inserted into the cavity.

9. The safety device of claim 1, further comprising means for securely latching the upper portion to the lower portion.

10. The safety device of claim 9, wherein the means for securely latching the upper portion to the lower portion comprises a locking arm having an end projection mounted on the upper portion and a tab extending inward on an inner portion of one of the opposing sidewalls of the lower portion, the end projection configured to engage the tab when the upper portion is rotated against the lower portion to hold the upper portion securely against the lower portion.

11. The safety device of claim 9, wherein the means for securely latching the upper portion to the lower portion comprises two locking arms each having an end projection mounted on the upper portion and two tabs each extending inward on respective ones of the two opposing sidewalls of the lower portion, each end projection configured to engage an associated one of the two tabs when the upper portion is rotated against the lower portion to hold the upper portion securely against the lower portion.

12. The safety device of claim 1, wherein the upper portion and the lower portion are formed from separate parts, and wherein the upper portion is mated to the lower portion via a hinge mechanism.

13. The safety device of claim 12, wherein the lower portion and the upper portion are formed from a same non-conductive material.

14. The safety device of claim 12, wherein the lower portion is formed from a first non-conductive material.

15. The safety device of claim 14, wherein the upper portion is formed from a second non-conductive material.

16. A safety device for preventing accidental discharge of an airbag, the safety device comprising:
a lower portion defining a cavity for receiving a seat belt buckle assembly, wherein the lower portion comprises at least one rear wall portion extending between opposing sidewalls that partially define the cavity, the at least one rear wall portion forming a slot area to permit a strap attached to the seat belt buckle assembly to extend from the cavity when the seat belt buckle assembly is positioned in the cavity, and wherein the at least one rear wall portion is configured to prevent the seat belt buckle assembly from moving laterally out of the cavity;
an upper portion hingedly coupled to the lower portion, wherein the upper portion completely covers the cavity of the lower portion when the upper portion is rotated into engagement with the lower portion; and
wherein the lower portion includes a channel on a lower surface thereof formed in a built-up area of the lower surface for securely holding a tongue plate, the channel adapted to fit an outer periphery of the tongue plate.

17. The safety device of claim 16, wherein the lower portion further comprises a tab adapted to snugly fit into an inner aperture in the tongue plate.

18. A method for covering a seat belt buckle assembly using a safety device, the safety device including a lower portion formed from a non-conductive material and defining a cavity having a volume at least as large as the entire seat belt buckle assembly, the lower portion having at least one rear wall portion extending between opposing sidewalls that partially define the cavity, the at least one rear wall portion forming a slot area, and wherein the at least one rear wall is configured to prevent the seat belt buckle assembly from moving laterally out of the cavity, the safety device further including an upper portion formed from a non-conductive material and hingedly coupled to the lower portion, the method comprising:
positioning the buckle assembly in the cavity of the lower portion such that a strap coupled to the buckle assembly extends from the lower portion through the slot area;
rotating the upper portion with respect to the lower portion such that the upper portion completely covers the buckle assembly; and
engaging the upper portion with the lower portion to secure the buckle assembly in the cavity.

19. The method of claim 18, wherein the lower portion includes a channel on a lower surface thereof formed in a built-up area of the lower surface for securely holding a tongue plate, the channel adapted to fit an outer periphery of the tongue plate, and a tab adapted to snugly fit into an inner aperture in the tongue plate, and further comprising the step of:
positioning a tongue plate against the lower surface so that the outer periphery of the tongue plate fits into the channel and the tab snugly fits into the inner aperture in the tongue plate.

* * * * *